June 10, 1941.  C. D. MILLER ET AL  2,244,956
SEAT
Filed Dec. 21, 1938
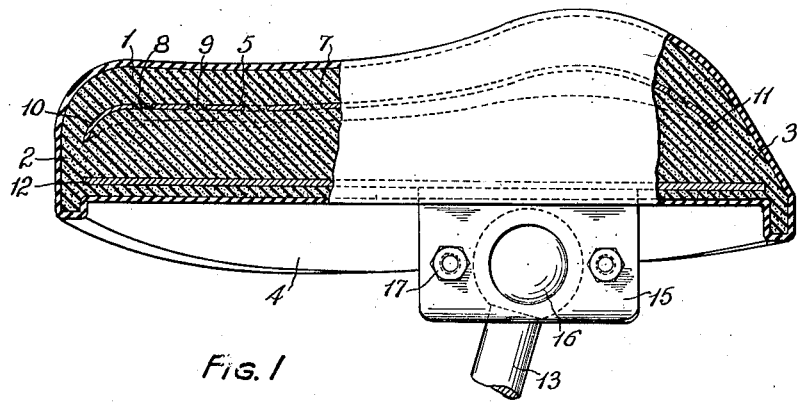
Fig. 1
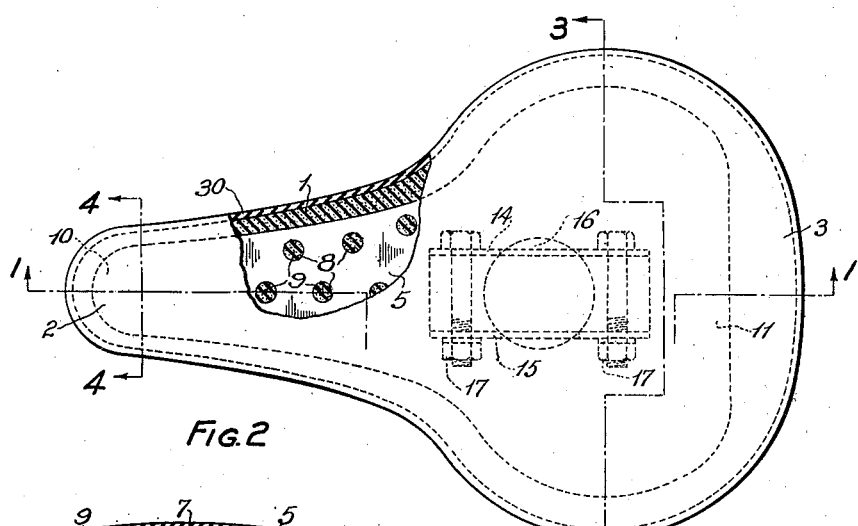
Fig. 2
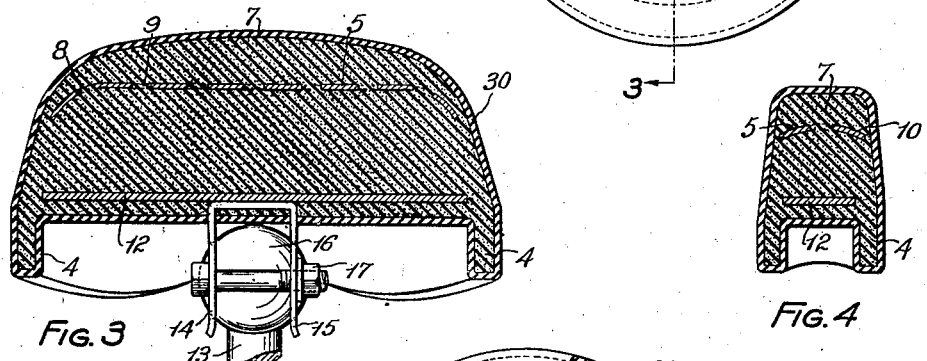
Fig. 3
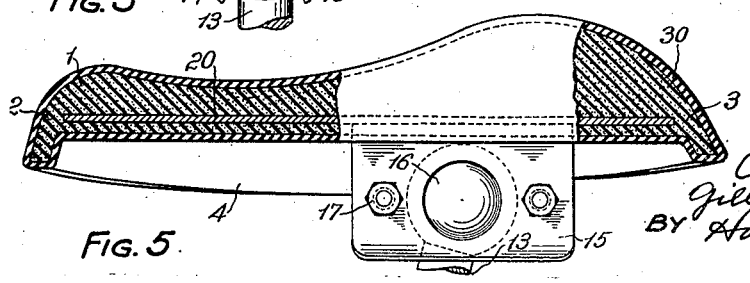
Fig. 4
Fig. 5
INVENTORS:
Calvin D. Miller
Gilbert P. Ickes
BY Haygood & Van Horn
THEIR ATTORNEYS.

Patented June 10, 1941

2,244,956

UNITED STATES PATENT OFFICE 2,244,956

SEAT

Calvin D. Miller and Gilbert P. Ickes, Elyria, Ohio

Application December 21, 1938, Serial No. 246,932

3 Claims. (Cl. 155—5.23)

Our invention is an improvement in seats and relates more particularly to saddles or bicycle seats.

One of the objects of the present invention is to provide a seat molded of sponge rubber or similar material in which is embedded one or more metal plates in spaced relation to provide a high degree of comfort and at the same time insure rigidity in the seat.

Another object of the invention resides in providing a molded rubber seat having a reinforcing plate embedded therein and extending longitudinally thereof and having a supporting plate near its under surface and spaced from the reinforcing plate.

A further object of the invention consists in a seat of soft rubber or sponge rubber provided with a longitudinal reinforcement embedded therein to maintain the general shape of the seat, and a second rigid member carried at the base of the seat to provide a means for attachment of the seat to a support or post, the rubber material between said rigid members forming a cushion for the load carried by the seat.

A still further object is to produce a device of the class described which is simple of construction and extremely durable in use and which is inexpensive to manufacture.

Other objects and advantages of the invention will become more apparent from the following description of two embodiments thereof, reference being made to the accompanying drawing in which like reference characters are employed to designate like parts throughout the same.

In the drawing:

Figure 1 is a side elevation of a seat or saddle embodying our invention, the same being shown partly in section;

Figure 2 is a top plan view of the same, broken away as indicated to more clearly illustrate the reinforcing plate embedded in the seat;

Figure 3 is a transverse section taken on line 3—3 of Figure 2;

Figure 4 is a section on line 4—4 of Figure 2; and

Figure 5 is a view, partly in section, of a modification of our invention.

Heretofore, it has been the common practice to make bicycle seats or saddles in the form of a more or less rigid body supported on a seat post or the like, by means of coiled springs and to thereby rely chiefly upon such springs for riding comfort. We are also aware of seats or saddles supported directly upon a post or upright, the resiliency of the seat being provided in a flexible plate having direct connection with the post, while the supporting surface of the seat may be composed of rubber or leather or other similar substance to give a very limited cushioning effect.

In carrying out our invention we provide a seat with a main body molded of sponge rubber or the like, to the desired size and form, and embed therein one or more spaced rigid members for purposes which will hereinafter more fully appear. In Figures 1 to 4 inclusive we have illustrated the preferred embodiment which may be described as follows:

The body portion of the seat is composed of vulcanizable sponge rubber 1 which may be molded to the desired form and shape in suitable molds provided for the purpose.

The form of the seat or saddle includes the forward portion or pommel 2, which gradually extends rearwardly to form the cantel portion 3. The upper supporting surface is concaved in the usual fashion for comfort of the rider.

The body of the seat extends downwardly on all sides to form a peripheral flange 4.

In order to impart the desired rigidity to the seat without destroying the high degree of resiliency of the rubber, we have provided a pair of spaced metal plates 5 and 12 which are embedded in the body 1 during the molding operation.

The plate 5 is shaped to the general contour of the seat and is embedded in the body sufficiently below the top surface thereof to support a cushion of rubber as at 7. It is to be noted that the plate 5 is attached to nothing but the rubber of the body 1 and therefore may be said to be capable of "floating" in the body when the body is placed under load in use.

This plate is preferably perforated as at 8 to receive the portions 9 of the rubber body to thereby anchor the plate in the selected position. It is also desirable to curve the forward and rear walls of the plate downwardly as at 10 and 11 to help maintain the seat shape under compression and to further assist in properly distributing the compression of the rubber below the plate when the seat is under load.

We have also provided a second or base plate 12, which is embedded in the body 1 near the lower portion thereof. To this plate may be attached any desirable clamping means to adjustably secure the seat to the post 13.

In the drawing we have illustrated a ball and socket connection for this purpose, although any suitable means may be employed. In the form illustrated the plate 12 is provided with a pair of depending clamp members 14 and 15, each of which is perforated to receive and grip the ball 16 carried by the post 13. Bolts 17 are provided to bind the members into gripping contact with the ball 16.

It is to be noted that by the construction we have provided, the portion of the rubber body above the floating plate 5 is possessed of sufficient resiliency to provide a comfortable support for the rider, while the rubber material between the plates 5 and 12 serves to cushion the full load which is supported by the base plate 12.

Under load, therefore, there may be relative movement between the plates 5 and 12 due to compression or expansion of the rubber material located between these plates. By providing the two plates in this manner separated by a substantial thickness of compressible rubber body, we have constructed a seat possessing not only high qualities of riding comfort and durability, but one which is extremely simple of construction and inexpensive to manufacture.

In Figure 5 we have illustrated a modified form of the invention, which differs from the embodiment illustrated in the other figures in that the present form is provided with a single plate 20 in the base of the seat. This form of the invention is particularly useful when the seat is designed for lighter loads, such as for juvenile use.

When used in this manner, the full load is supported by the plate 20 and the rubber material of the body above the plate is compressible against the plate. The plate 20 serves to maintain the shape of the seat and to support the load.

In both forms of the invention, we have illustrated a further improvement which consists in providing an outer coating 30 to the seat body. This coating is preferably formed of latex which is applied to the inner surfaces of the mold prior to the application of the sponge rubber body. When the body material is applied and the mold heated, of course, the latex coating will become vulcanized or fused to the body.

Certain advantages are thus provided by this coating. It provides a smoother finish to the seat and serves to protect the body material.

Furthermore, it may be applied in such a way as to embody a design or initials in the top surface of the seat, thereby enhancing the appearance of the seat.

It is to be understood that we do not limit our invention to a seat body formed of molded rubber material, since we have found that the body may be fabricated—that is, built up in sections bound together in any suitable fashion. For instance, the body may be laminated, the plates 5 and 12 being disposed in the relative positions as described above.

Various changes may be made in the details of construction of the invention without departing from the spirit thereof or the scope of the appended claims.

We claim:

1. A seat comprising a body of rubber material and a pair of vertically spaced relatively movable rigid plates embedded in said material, one of said plates having its edges curved toward said other plate to partially embrace the rubber material therebetween.

2. A seat comprising a body of molded rubber material and a pair of vertically spaced relatively movable rigid plates embedded in said material, one of said plates having its edges curved toward said other plate to partially embrace the rubber material therebetween, said plate also being perforated to provide an anchorage for the material of the body.

3. A seat or saddle comprising a molded body of rubber, a reinforcing plate embedded within the body material near the load supporting surface of the seat or saddle, a base plate embedded in the lower portion of the body, said plates being relatively movable when the seat is under load, to compress the rubber material therebetween.

CALVIN D. MILLER.
GILBERT P. ICKES.